(12) United States Patent
Teratani et al.

(10) Patent No.: US 9,696,333 B2
(45) Date of Patent: Jul. 4, 2017

(54) DISPLAY CONTROL APPARATUS FOR METER

(71) Applicant: TOYOTA JIDOSHA KABUSHIKI KAISHA, Toyota-shi, Aichi-ken (JP)

(72) Inventors: Yoshiyuki Teratani, Nagoya (JP); Masayasu Mizobuchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 14/855,013

(22) Filed: Sep. 15, 2015

(65) Prior Publication Data

US 2016/0084874 A1    Mar. 24, 2016

(30) Foreign Application Priority Data

Sep. 22, 2014 (JP) ................. 2014-192657

(51) Int. Cl.
| | |
|---|---|
| G01P 21/00 | (2006.01) |
| G01P 1/07 | (2006.01) |
| G01P 3/00 | (2006.01) |
| B60R 16/02 | (2006.01) |
| B60K 35/00 | (2006.01) |

(52) U.S. Cl.
CPC .............. *G01P 1/07* (2013.01); *B60K 35/00* (2013.01)

(58) Field of Classification Search
None
See application file for complete search history.

(56) References Cited

U.S. PATENT DOCUMENTS 6,014,604 A * 1/2000 Kuroiwa ............... B60W 10/06
477/115

FOREIGN PATENT DOCUMENTS

| JP | 2009-029401 A | 2/2009 |
| JP | 2009-220678 A | 10/2009 |

* cited by examiner

*Primary Examiner* — Rami Khatib
(74) *Attorney, Agent, or Firm* — Oliff PLC (57) ABSTRACT

A display control apparatus for a meter is provided. The display control apparatus includes an electronic control unit. The electronic control unit is configured to: (i) when a shift start condition of an automatic transmission is satisfied, calculate an estimated rotation speed of an engine by adding a correction amount commensurate with a state of a torque converter to a turbine rotation speed of the torque converter, the turbine rotation speed corresponding to a gear position after a shift; (ii) control the meter such that a rotation speed displayed on the meter is brought close to the estimated rotation speed; and (iii) when a fixing condition, including that the shift start condition for a downshift is satisfied and the engine is driven from the torque converter side, is satisfied, fix the correction amount to a value at the time when a start of the shift is determined.

5 Claims, 9 Drawing Sheets

DISPLAY CONTROL APPARATUS FOR METER

INCORPORATION BY REFERENCE

The disclosure of Japanese Patent Application No. 2014-192657 filed on Sep. 22, 2014 including the specification, drawings and abstract is incorporated herein by reference in its entirety.

BACKGROUND OF THE INVENTION

1. Field of the Invention

The invention relates to a display control apparatus for a meter and, more particularly, to a display control apparatus for a meter that is provided in a vehicle including an automatic transmission, including a torque converter, and that displays an engine rotation speed.

2. Description of Related Art

Generally, an automobile, or the like, includes a meter that displays an engine rotation speed (so-called tachometer). Japanese Patent Application Publication No. 2009-220678 (JP 2009-220678 A) describes a technique for estimating an engine rotation speed and then causing a tachometer to display the estimated engine rotation speed in order to improve the responsiveness of the tachometer during a shift.

SUMMARY OF THE INVENTION

In JP 2009-220678 A, when a shift occurs, an engine rotation speed displayed on the meter is estimated on the basis of a turbine rotation speed that is predicted in the case where an automatic transmission is set to a gear position after the shift.

However, if such an estimation process is constantly applied, the displayed engine rotation speed may temporarily decrease although an actual engine rotation speed is increasing, as will be described later.

The direction of a change in the actual engine rotation speed and the direction of a change in the engine rotation speed displayed on the meter desirably remain coincident with each other as much as possible because this situation matches with a feeling of a driver.

The invention provides a display control apparatus for a meter, which reduces an unnatural display while maintaining the responsiveness of an engine rotation speed that is displayed on the meter.

A display control apparatus for a meter according to an aspect of the invention is provided. The meter is mounted on a vehicle. The vehicle includes an engine and an automatic transmission. The automatic transmission includes a torque converter. The meter is configured to display a rotation speed of the engine. The display control apparatus includes an electronic control unit. The electronic control unit is configured to: (i) when a shift start condition of the automatic transmission is satisfied, calculate an estimated rotation speed of the engine by adding a correction amount commensurate with a state of the torque converter to a turbine rotation speed of the torque converter, the turbine rotation speed corresponding to a gear position after a shift; (ii) control the meter such that a rotation speed displayed on the meter is brought close to the estimated rotation speed; and (iii) when a fixing condition, including that the shift start condition is satisfied and the engine is driven from the torque converter side, is satisfied, fix the correction amount to a value at the time when a start of the shift is determined.

According to the above aspect, in a state where the engine is driven from the torque converter side, a change, such as inversion of the sign of the correction amount, does not occur because the correction amount is fixed to a value at the start of the shift, so it is possible to reduce an unnatural change in the meter rotation speed.

In the above aspect, the correction amount may be a difference between an engine rotation speed and a turbine rotation speed. Another method of calculating the correction amount, such as calculating the correction amount from the torque capacity of a clutch, is conceivable; however, according to this aspect, it is possible to easily obtain the correction amount by using the rotation speed difference.

In the above aspect, the electronic control unit may be configured to, when a difference between a current engine rotation speed and a current turbine rotation speed becomes larger than the fixed correction amount, cancel fixing of the correction amount and use the difference between the current engine rotation speed and the current turbine rotation speed as the correction amount.

According to the above aspect, when the correction amount is set to the difference between the engine rotation speed and the turbine rotation speed and then the correction amount is fixed, fixing of the correction amount is cancelled as the engine returns from the driven state to the driving state, and the meter rotation speed is returned to an original state. Thus, it is possible to return to a meter display improved in a delay of a change in the meter rotation speed due to a delay in detection of the engine rotation speed, and the like.

In the above aspect, the display control apparatus may further include a rotation sensor configured to detect a rotation speed of the engine. The electronic control unit may be configured to: (iv) determine on the basis of an accelerator operation amount and a vehicle speed whether the shift start condition is satisfied, and output a gear position after the shift; (v) calculate a turbine rotation speed after the shift on the basis of the vehicle speed and the gear position after the shift; and (vi) change a target value of the displayed rotation speed to one of the estimated rotation speed and the rotation speed of the engine, detected by the rotation sensor, on the basis of a progress of the shift.

According to the above aspect, the responsiveness of the meter rotation speed is improved, so it is possible to provide the display control apparatus that outputs a meter rotation speed that naturally changes even during a downshift.

In the above aspect, the electronic control unit may be configured to change a rate at which the rotation speed displayed on the meter is brought close to the target value, on the basis of the progress of the shift.

According to the above aspect, it is possible to slow a change in the meter rotation speed at a degree commensurate with a phase that indicates the progress of a shift.

In the above aspect, the fixing condition may include that blipping control for increasing an engine torque by increasing a throttle opening degree during a shift is not executed.

According to the above aspect, during blipping control in which an increase in the engine rotation speed is assumed, it is possible to keep the state where the responsiveness of the meter rotation speed is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In the following description, like reference numerals denote the same components. The names and functions of them are also the same. Therefore, the detailed description thereof will not be repeated.

Figure 1:
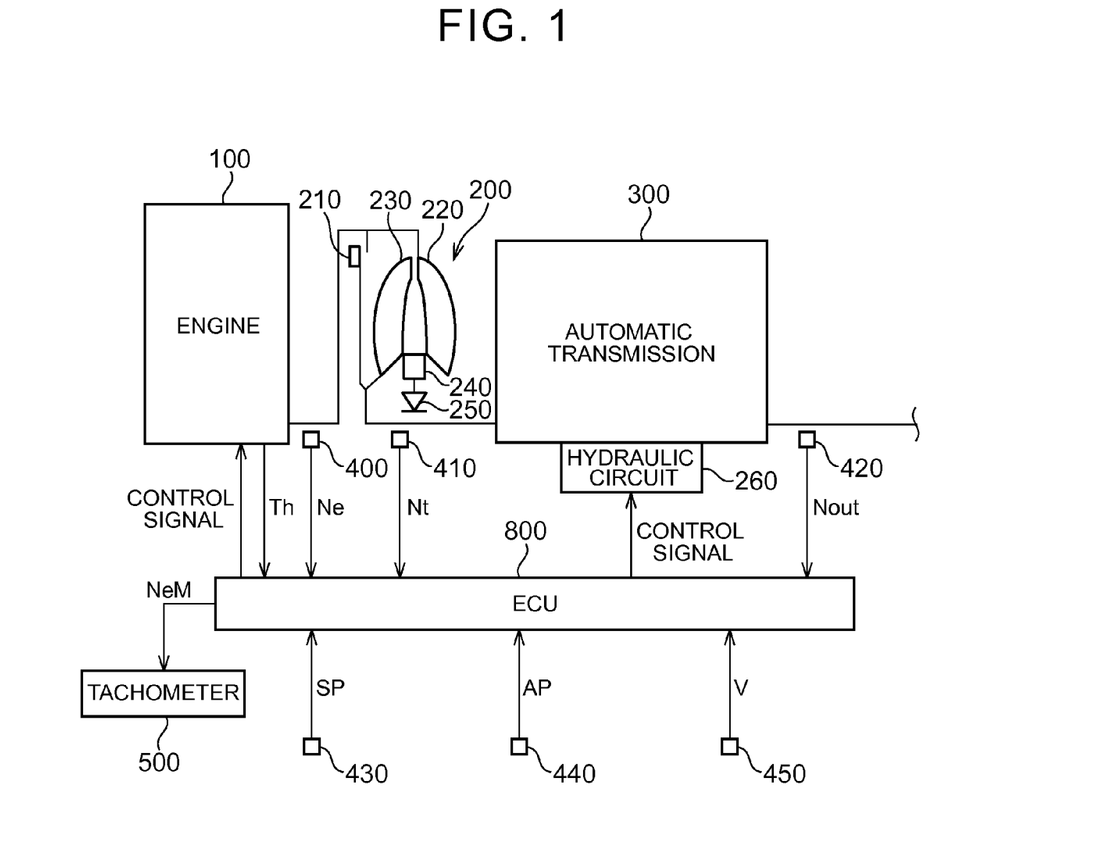
FIG. 1 is a view that shows the configuration of a powertrain of a vehicle on which a control apparatus for a vehicle according to an embodiment is mounted.

FIG. 1 is a view that shows the configuration of a powertrain of a vehicle on which a control apparatus for a vehicle according to the present embodiment of the invention is mounted.

As shown in FIG. 1, the powertrain of the vehicle includes an engine 100 that is a driving force source, a torque converter 200, a stepped automatic transmission 300, an electronic control unit (ECU) 800, and a tachometer 500.

The output shaft of the engine 100 is connected to the input shaft of the torque converter 200. The torque converter 200 includes a lockup clutch 210, an input shaft-side pump impeller 220, an output shaft-side turbine runner 230, and a stator 240. The lockup clutch 210 directly couples the input shaft to the output shaft. The stator 240 includes a one-way clutch 250, and exhibits a torque amplification function. The output shaft of the torque converter 200 is connected to the input shaft of the automatic transmission 300.

The torque converter 200 transmits a torque, corresponding to a slip amount, from the engine 100 side to the automatic transmission 300 side. The slip amount is the difference between the rotation speed of the input shaft-side pump impeller 220 (that is, the rotation speed of the engine 100) and the rotation speed of the output shaft-side turbine runner 230 (that is, the input shaft rotation speed of the automatic transmission 300).

The automatic transmission 300 includes a plurality of planetary gear units, a plurality of hydraulic friction engagement elements, and a hydraulic circuit 260. The hydraulic circuit 260 is used to adjust hydraulic pressures that are supplied to the plurality of friction engagement elements. The hydraulic circuit 260 is formed of an oil pump, various solenoids and oil passages (all of which are not shown). The various solenoids are controlled on the basis of control signals from the ECU 800. The ECU 800 controls engagement force of each of the plurality of friction engagement elements by controlling the various solenoids of the hydraulic circuit 260, thus controlling a speed ratio of the automatic transmission 300.

An engine rotation speed sensor 400, a turbine rotation speed sensor 410, an output shaft rotation speed sensor 420, a position switch 430, an accelerator operation amount sensor 440, a vehicle speed sensor 450, and the like, are connected via a wire harness, or the like, to the ECU 800 that controls the powertrain.

The engine rotation speed sensor 400 detects the rotation speed (engine rotation speed) Ne of the engine 100. The turbine rotation speed sensor 410 detects the rotation speed (turbine rotation speed) Nt of the turbine runner 230 of the torque converter 200. The output shaft rotation speed sensor 420 detects the rotation speed (output shaft rotation speed) Nout of the output shaft of the automatic transmission 300. The position switch 430 detects the position (shift position) SP of a shift lever that is operated by a driver. The accelerator operation amount sensor 440 detects an actual operation amount (actual accelerator operation amount) AP of an accelerator pedal by the driver. The vehicle speed sensor 450 detects a vehicle speed on the basis of the rotation speed of each wheel. Although not shown in the drawing, a throttle opening degree sensor provided in the engine 100 detects a throttle opening degree th. These sensors transmit signals indicating detected results to the ECU 800.

The ECU 800 calculates a meter rotation speed NeM on the basis of the signals from the above-described sensors, and causes the tachometer 500 to display the calculated meter rotation speed NeM.

Figure 2:
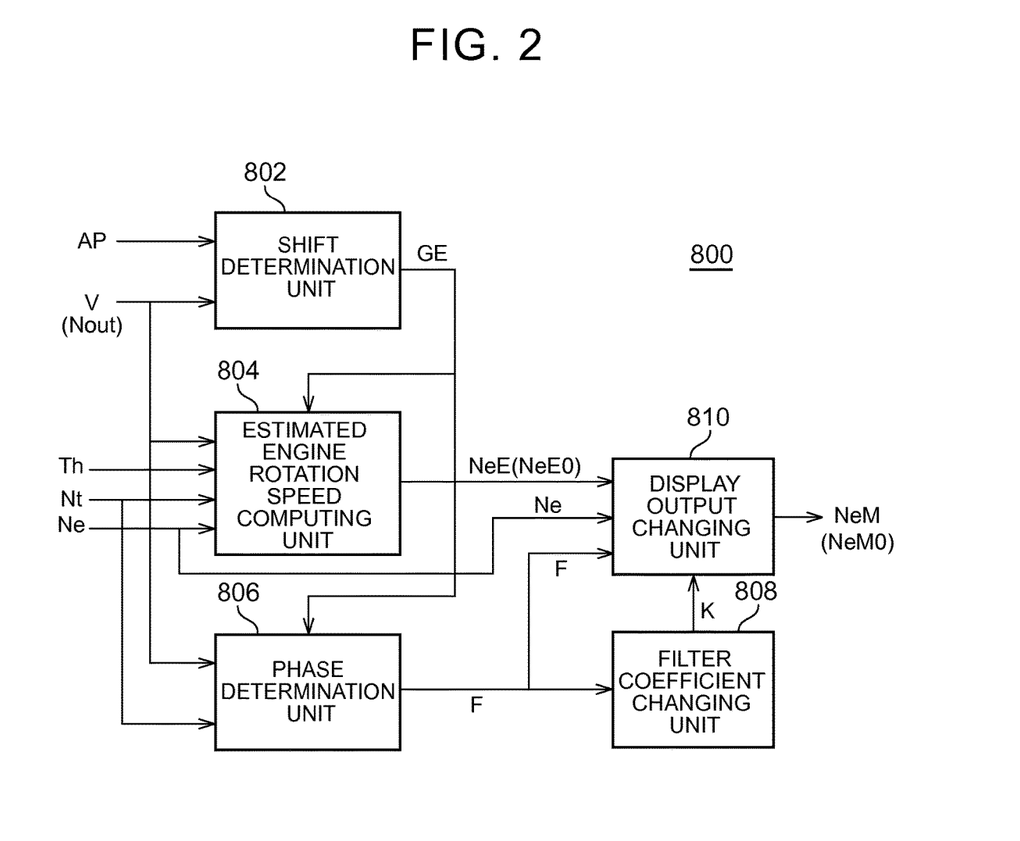
FIG. 2 is a block diagram that shows the configuration of an ECU associated with a meter display.

FIG. 2 is a block diagram that shows the configuration of the ECU 800 associated with a meter display. As shown in FIG. 2, the ECU 800 includes a shift determination unit 802, an estimated engine rotation speed computing unit 804, a phase determination unit 806, a filter coefficient changing unit 808, and a display output changing unit 810.

The shift determination unit 802 makes a shift determination of the automatic transmission 300 on the basis of the accelerator operation amount AP and the vehicle speed V by consulting a predetermined shift line map, and outputs a gear position GE after a shift. When the vehicle is set in a manual shift mode, the shift determination unit 802 outputs a gear position GE after a shift on the basis of a driver's shift operation.

The estimated engine rotation speed computing unit 804 calculates an estimated engine rotation speed NeE on the basis of the vehicle speed V, the throttle opening degree th, the turbine rotation speed Nt, the engine rotation speed Ne and the gear position GE after the shift. Specifically, where a current gear position is G and a gear position after a downshift is G−1, the estimated engine rotation speed computing unit 804 calculates a turbine rotation speed Nt(G−1) after the shift on the basis of the vehicle speed V and the gear position GE after the shift (=G−1), and calculates an estimated engine rotation speed NeE by adding a correction amount ΔN to the turbine rotation speed Nt(G−1) after the shift. The correction amount ΔN will be described later with reference to FIG. 3 and FIG. 4.

The phase determination unit 806 outputs a phase signal F on the basis of the vehicle speed V, the gear position GE and the turbine rotation speed Nt. The phase signal F indicates the degree of progress of a shift. An initial stage from when a shift determination is made to when the turbine rotation speed Nt begins to change is termed preparing phase (F=0), a stage in which the turbine rotation speed Nt is changing because of a shift is termed change phase (F=1), and a stage from when the change in the turbine rotation speed Nt due to the shift substantially completes to completion of the shift is termed end phase (F=2). The phase signal F indicates that the degree of progress of a current shift is any one of the phases (which will also be described later with reference to FIG. 3 and FIG. 4).

The filter coefficient changing unit 808 determines a filter coefficient K on the basis of the phase signal F. The filter coefficient K is used at the time when the display output changing unit 810 executes filtering.

The display output changing unit 810 executes filtering such that the meter rotation speed NeM changes slowly even in the case where a target value to be displayed has steeply changed. The display output changing unit 810 selects one of the engine rotation speed Ne and the estimated engine rotation speed NeE for the target value of the meter rotation speed NeM on the basis of the progress of a shift, that is, the phase signal F, and outputs the meter rotation speed NeM such that the meter rotation speed NeM follows the selected target value at a rate corresponding to the filter coefficient K. Such a process is called filtering, and can be called smoothing.

More specifically, the display output changing unit 810 determines the amount of change per one process cycle such that the current meter rotation speed NeM reaches the target value after a time corresponding to the filter coefficient K, and calculates a next-cycle meter rotation speed NeM.

In the ECU 800 having such a configuration, if the process of estimating the engine rotation speed is executed in the same way at any time, the displayed engine rotation speed NeM temporarily decreases while the actual engine rotation speed Ne is increasing as will be described later with reference to FIG. 3.

Figure 3:
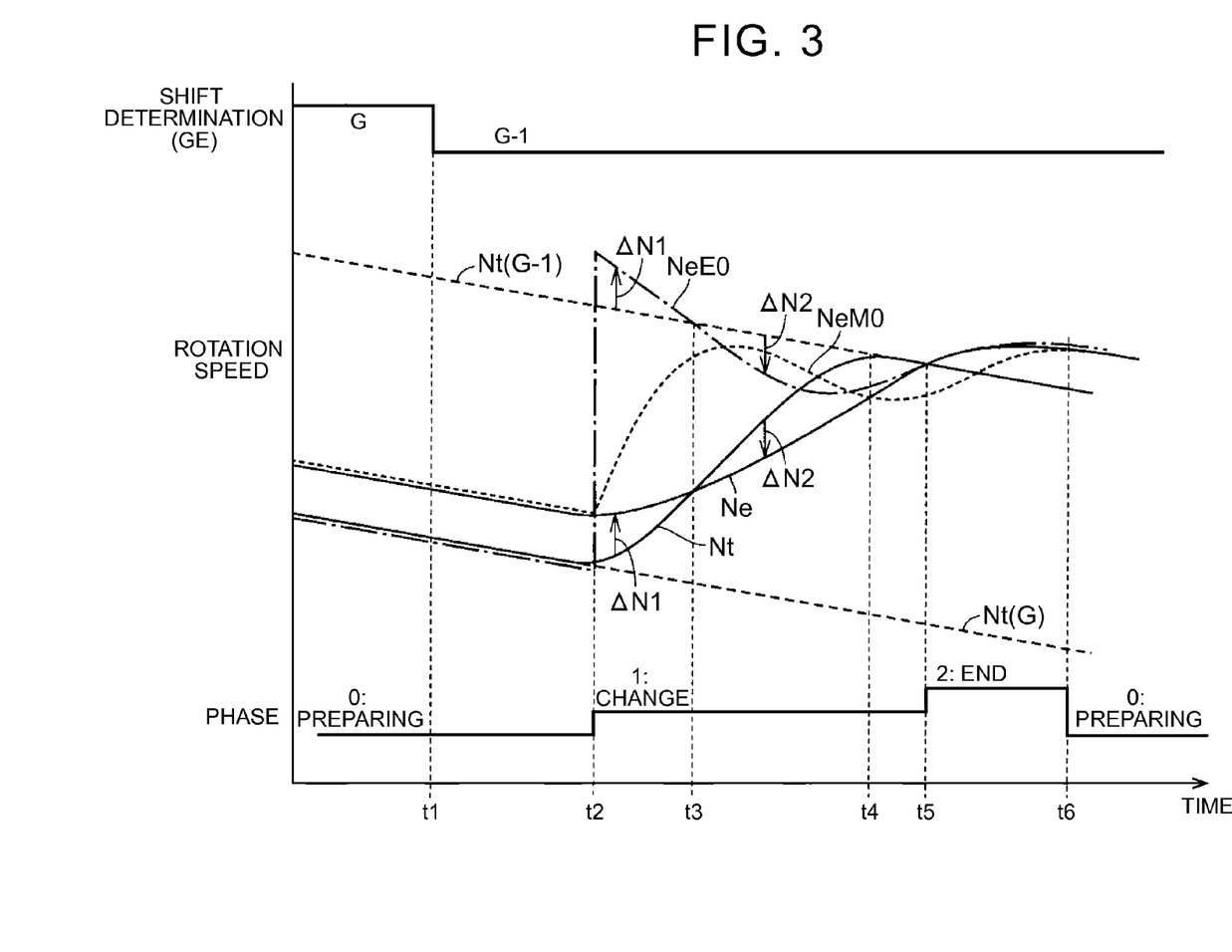
FIG. 3 is an operation waveform chart for illustrating an example of a phenomenon that a displayed engine rotation speed temporarily decreases.

FIG. 3 is an operation waveform chart for illustrating an example of a phenomenon that the displayed engine rotation speed temporarily decreases. As shown in FIG. 2 and FIG. 3, the gear position GE that indicates the result of a shift determination changes from G (for example, third speed) to G−1(for example, second speed) at time t1.

A rotation speed Nt(G) indicates a turbine rotation speed that is calculated by using the vehicle speed V and the speed ratio of the automatic transmission at the gear position G. A rotation speed Nt(G−1) indicates a turbine rotation speed that is calculated by using the vehicle speed V and the speed ratio of the automatic transmission at the gear position G−1. In FIG. 3, the vehicle speed is decreasing, so Nt(G) and Nt(G−1) both decrease with a lapse of time. With the progress of the shift, the turbine rotation speed Nt changes from Nt(G) toward Nt(G−1).

The phase that indicates the degree of progress of a shift corresponds to the phase signal F in FIG. 2, and changes in order of the preparing phase, the change phase and the end phase. In FIG. 3, the phase is the preparing phase (F=0) until time t2, the change phase (F=1) from time t2 to time t5, the end phase (F=2) from time t5 to time t6, or the preparing phase at time t6 again.

When the engine rotation speed suddenly changes as in the case during a shift, a delay of a display on the tachometer 500 tends to occur. This delay in response is due to a time that is taken by the process of computing the engine rotation speed on the basis of an input signal from the engine rotation speed sensor or a response time of the tachometer 500 to the computed engine rotation speed.

In order to eliminate the delay, it is conceivable to display an engine rotation speed on the tachometer 500 by predicting a change in the engine rotation speed. During a shift from the gear position G to the gear position G−1, when the gear position G−1 after the shift is acquired, it is possible to predict that the turbine rotation speed Nt changes from Nt(G) to Nt(G−1). When the torque converter 200 is in a lockup state, Nt(G−1) is set as a target value after the shift, and then undergoes filtering by the filter coefficient K that indicates an appropriate rate of change. Thus, it is possible to change the meter rotation speed NeM in advance of a change in the detected engine rotation speed Ne.

When the torque converter 200 is not in the lockup state, there occurs a difference in rotation speed (Ne−Nt) between the engine rotation speed Ne and the turbine rotation speed Nt due to a slip of the torque converter 200. Therefore, when the torque converter 200 is not in the lockup state, an estimated engine rotation speed NeE0 that is the target value is obtained by adding a correction amount to the turbine rotation speed Nt(G−1) obtained from the gear position G−1 after the shift. In this case, Ne−Nt that is the difference between the input and output rotation speeds of the torque converter is used as the correction amount.

In this case, the estimated engine rotation speed NeE0 from time t2 to time t5 is expressed by the following mathematical expression.

$$NeE0 = Nt(G-1) + \Delta N$$

Where $\Delta N$ is the correction amount, and $\Delta N = (Ne-Nt)$.

The difference Ne−Nt between the input and output rotation speeds of the torque converter is not always a positive value. The sign of the difference Ne−Nt is inverted between when the engine is in a driving state and when the engine is in a driven state.

The engine driving state indicates a state where the torque converter 200 is driven by the power of the engine 100. The turbine rotation speed Nt delays due to a slip of the torque converter with respect to the engine rotation speed Ne(Ne>Nt). The engine driven state indicates a state where the engine 100 is driven by the inertia force of the vehicle from the torque converter 200 side. The turbine rotation speed Nt of the torque converter is higher than the engine rotation speed Ne (Nt>Ne).

For example, when the vehicle is accelerated by the engine 100 in a state where the accelerator is depressed, the engine is in the driving state and Ne>Nt, so $\Delta N$>0; whereas, when engine brake works in a state where the accelerator is released, the engine is in the driven state and Ne is lower than Nt, so $\Delta N$ is smaller than 0.

Particularly, in the case where a downshift occurs in the state where the accelerator is released as shown in FIG. 3, even when Ne is higher than Nt in the initial stage of the shift (time t2 to time t3), Nt is increased from the automatic transmission side in the stage (time t3 to time t5) in which the shift has progressed, and Ne is also increased from the torque converter side accordingly, so Ne is lower than Nt.

That is, the correction amount $\Delta N$ is $\Delta N1$ (>0) from time t2 to time t3 in the engine driving state in the initial stage of the shift; whereas the engine becomes the driven state with the progress of the shift, and, from time t3 to time t5, the correction amount $\Delta N$ is $\Delta N2$ (<0) and the sign of the correction amount $\Delta N$ is inverted from positive to negative. Therefore, the estimated engine rotation speed NeE0 temporarily decreases by a large amount, and the meter rotation speed NeM0 that changes following the estimated engine rotation speed NeE0 as the target value also changes in an opposite direction from the engine rotation speed Ne from time t3 to time t4. Such a change does not match with a feeling of a driver.

In the present embodiment, when the engine becomes the driven state in the case where a downshift has occurred in the state where the torque converter is not in the lockup state, a correction amount ΔN at the start of the shift is stored and then the correction amount ΔN is fixed at this value until the end of the shift such that inversion of the correction amount ΔN does not occur.

Figure 4:
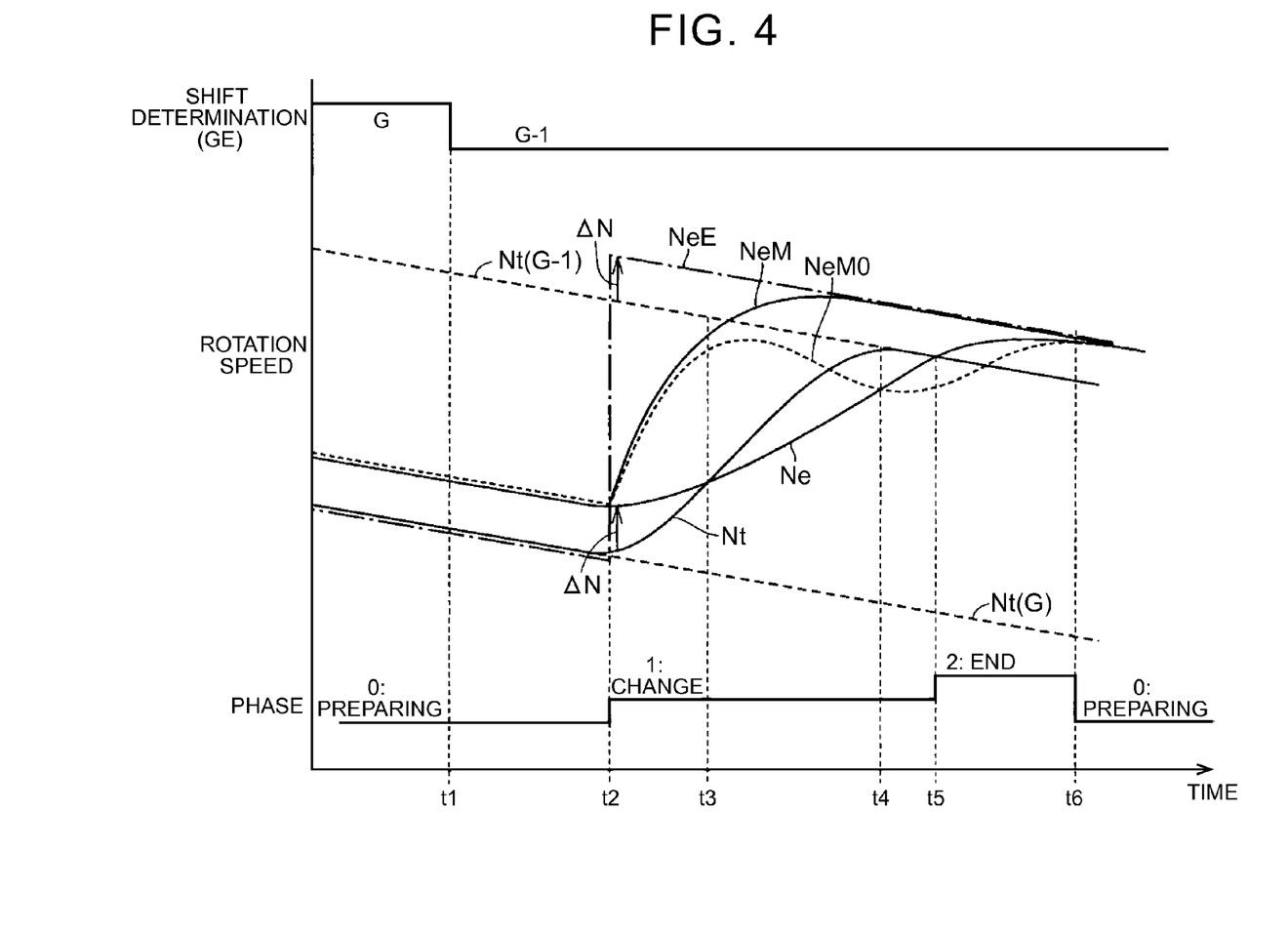
FIG. 4 is an operation waveform chart for illustrating a meter display improved in the embodiment.

FIG. 4 is an operation waveform chart for illustrating a meter display improved in the present embodiment. In the waveform in FIG. 4, a shift determination and a phase are the same as those in the case described with reference to FIG. 3, so the description will not be repeated. As shown in FIG. 2 and FIG. 4, the correction amount ΔN (=Ne−Nt) is fixed at the start of the shift at time t2 (at the time when the turbine rotation speed Nt changes from Nt(G) toward Nt(G−1)).

From time t2 to time t6, the target value (estimated engine rotation speed NeE) of the displayed engine rotation speed NeM is Nt(G−1)+ΔN.

The estimated engine rotation speed NeE is set for the target value and the meter rotation speed NeM is caused to follow the target value while undergoing filtering. As a result, the meter rotation speed NeM slowly increases from time t2 to time t4, and decreases at substantially the same slope as Nt(G−1) from time t4.

The correction amount ΔN for the estimated engine rotation speed NeE does not fluctuate unlike NeE0 shown in FIG. 3, so the estimated engine rotation speed NeE is suppressed to such an extent that Nt(G−1) decreases with a deceleration of the vehicle.

Therefore, the direction of a change in the meter rotation speed NeM does not become opposite from the direction of a change in the engine rotation speed Ne unlike NeM0 shown in FIG. 3, and the meter rotation speed NeM matches with a feeling of a driver.

Next, the process that is executed by the ECU 800 in order to achieve a meter display shown in FIG. 4 will be described.

Figure 5:
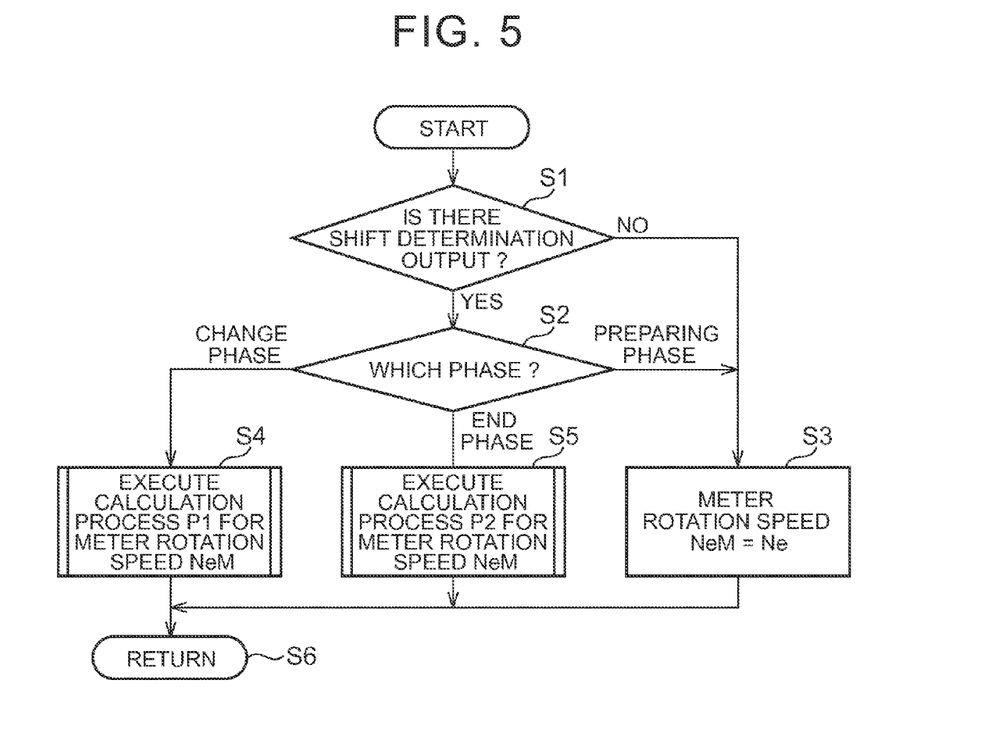
FIG. 5 is a main routine of a meter display process that is executed by the ECU.

FIG. 5 is a main routine of a meter display process that is executed by the ECU 800. As shown in FIG. 5, the ECU 800 makes a shift determination on the basis of the shift line map in step S1, and determines whether there is a shift determination output.

Figure 6:
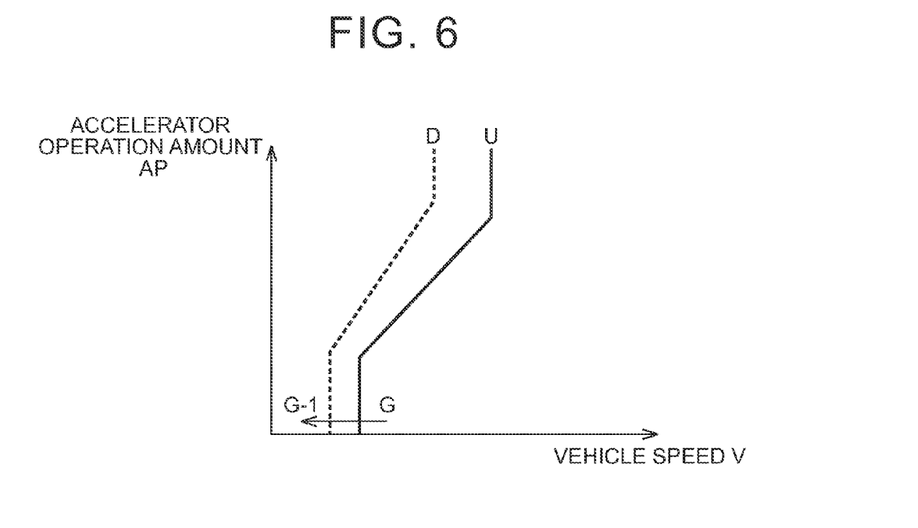
FIG. 6 is a view that shows an example of a shift line map for illustrating a shift determination output.

FIG. 6 is a view that shows an example of the shift line map for illustrating a shift determination output. In the case of a downshift in the state where the accelerator is released during deceleration, as shown in FIG. 6, as the vehicle speed V decreases while the accelerator operation amount AP is zero, the operation point of the vehicle crosses a downshift line D from a high vehicle speed side toward a low vehicle speed side, so a shift determination of a downshift from the gear position G to the gear position G−1 is made.

Even a vehicle on which an automatic transmission is mounted may include a manual shift mode in which a downshift or an upshift is carried out in response to user's instruction with the use of a shift lever. When such a vehicle is set to the manual shift mode, a shift determination of an upshift or downshift is made in response to user's shift lever operation.

Referring back to FIG. 5, when the ECU 800 determines in step S1 that there is no shift determination output (NO in step S1), the ECU 800 advances the process to step S3. In step S3, the ECU 800 sets the meter rotation speed NeM to the current engine rotation speed Ne, and transmits the meter rotation speed NeM to the tachometer 500.

On the other hand, when the ECU 800 determines in step S1 that there is a shift determination output (YES in step S1), the ECU 800 advances the process to step S2. In step S2, the phase that indicates the degree of progress of the shift is determined The phase determination process will be described in detail later with reference to FIG. 7.

When it is determined in step S2 that the current phase is the change phase, the process proceeds to step S4, and a calculation process P1 for calculating the meter rotation speed NeM is executed. The calculation process P1 will be described later in detail with reference to FIG. 8.

When it is determined in step S2 that the current phase is the end phase, the process proceeds to step S5, and a calculation process P2 for calculating the meter rotation speed NeM is executed. The calculation process P2 will be described later in detail with reference to FIG. 11.

When it is determined in step S2 that the current phase is the preparing phase, the process proceeds to step S3, the ECU 800 sets the meter rotation speed NeM to the current engine rotation speed Ne, and transmits the meter rotation speed NeM to the tachometer 500.

When the meter rotation speed NeM is calculated in any one of step S3 to step S5, control is returned to the main routine in step S6.

Figure 7:
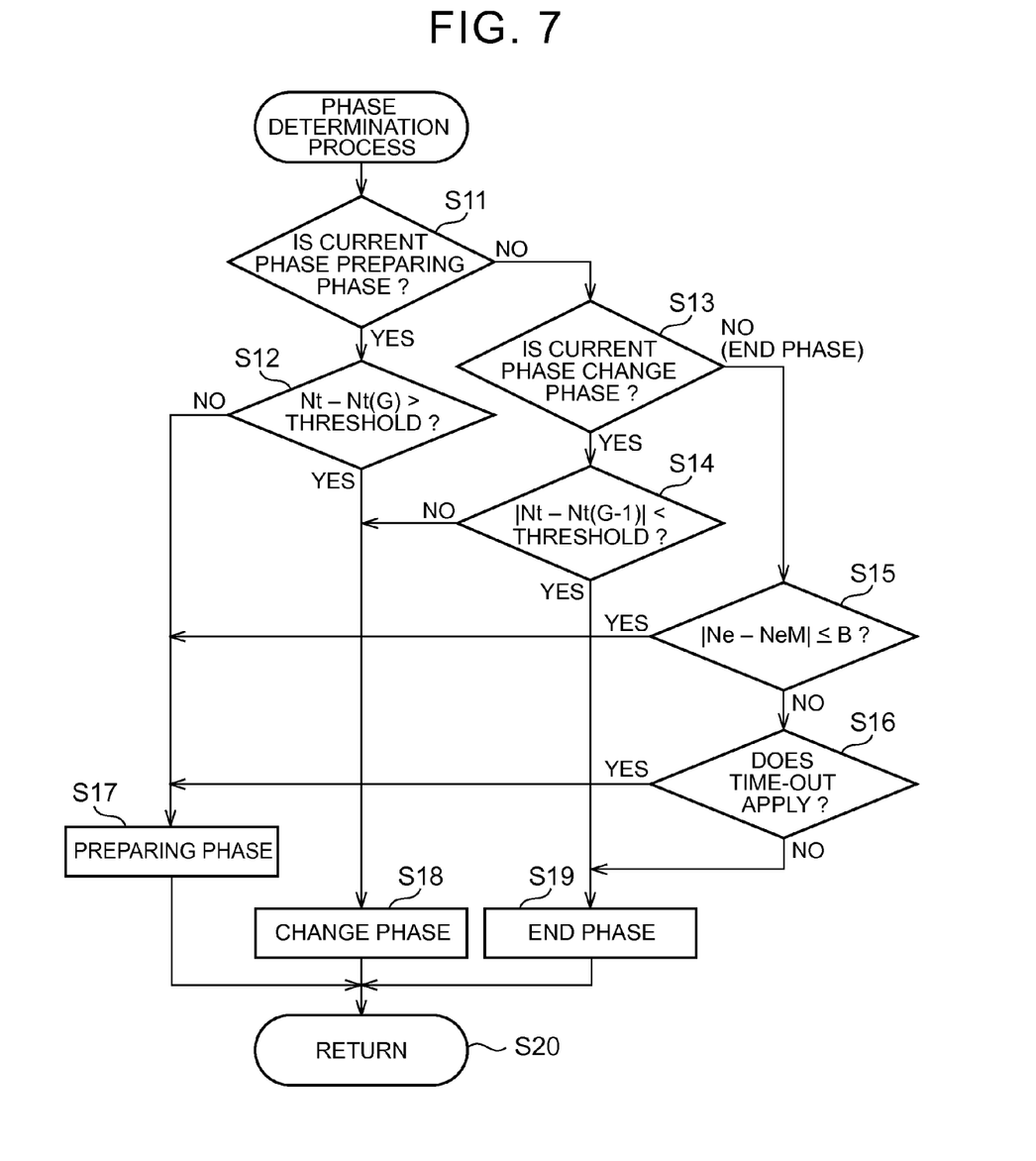
FIG. 7 is a flowchart for illustrating a phase determination process that is executed in step S2 of FIG. 5.

FIG. 7 is a flowchart for illustrating the phase determination process that is executed in step S2 of FIG. 5. As shown in FIG. 7, the ECU 800 initially determines in step S11 whether the current phase is the preparing phase. The ECU 800 stores the current phase as a variable F. In the case of F=0, the current phase is the preparing phase. In the case of F=1, the current phase is the change phase. In the case of F=2, the current phase is the end phase.

When the current phase is the preparing phase in step S11 (YES in step S11), the process proceeds to step S12. In step S12, the ECU 800 determines whether the current turbine rotation speed Nt has changed from the turbine rotation speed Nt(G) corresponding to the gear position G before the shift. Specifically, the ECU 800 determines whether Nt−Nt(G) is larger than a threshold.

When Nt−Nt(G) is not larger than the threshold in step S12 (NO in step S12), the process proceeds to step S17, and it is continuously determined that the current phase is the preparing phase. When Nt−Nt(G) is larger than the threshold in step S12 (YES in step S12), the process proceeds to step S18, and it is determined that the phase changes from the preparing phase to the change phase. For example, around time t2 in FIG. 4, Nt changes from Nt(G) and begins to increase toward Nt(G−1), and, as a result of the fact that affirmative determination is made in step S12, the phase has changed from the preparing phase to the change phase.

When it is determined in step S11 that the current phase is not the preparing phase (NO in step S11), the process proceeds to step S13. In step S13, it is determined whether the current phase is the change phase.

When it is determined in step S13 that the current phase is the change phase (YES in step S13), the process proceeds to step S14. In step S14, it is determined whether the condition of changing from the change phase to the end phase is satisfied. This condition is satisfied when the state where the turbine rotation speed Nt is sufficiently close to the turbine rotation speed Nt(G−1) corresponding to the gear position G−1 after the shift has continued, and is specifically satisfied when |Nt−Nt(G−1)| is smaller than a threshold.

When the condition of changing from the change phase to the end phase is not satisfied in step S14 (NO in step S14), the process proceeds to step S18, and the phase remains at the change phase. On the other hand, when the condition of changing from the change phase to the end phase is satisfied in step S14 (YES in step S14), the process proceeds to step S19, and it is determined that the phase changes from the change phase to the end phase.

For example, around time t5 in FIG. 4, the state where the turbine rotation speed Nt is close to the target turbine rotation speed Nt(G−1) indicates that |Nt−Nt(G−1)| becomes smaller than the threshold, so affirmative determination is made in step S14, with the result that the phase changes from the change phase to the end phase.

When negative determination is made in step S13, the current phase is the end phase. In this case, it is determined in step S15 whether the difference between the meter rotation speed NeM and the engine rotation speed Ne is smaller than or equal to a threshold B. When |Ne−NeM| is smaller than or equal to B in step S15 (YES in step S15), the phase changes from the end phase to the preparing phase.

For example, around time t6 in FIG. 4, |Ne−NeM|≤B is satisfied, so affirmative determination is made in step S15, with the result that the phase changes from the change phase to the end phase.

On the other hand, when |Ne−NeM| is not smaller than or equal to B in step S15 (NO in step S15), the process proceeds to step S16, and it is determined whether time-out applies. Time-out applies when the end phase continues for a predetermined time.

When time-out applies in step S16 (YES in step S16), the process proceeds to step S17, and the phase changes from the end phase to the preparing phase. On the other hand, when time-out does not apply in step S16 (NO in step S16), the phase remains at the end phase.

When the phase is determined in any one of step S17 to step S19, the process proceeds to step S20, and control is returned to the flowchart of FIG. 5.

A determination of the phase is described above. Next, the calculation process for the meter rotation speed NeM, which is executed in the change phase or the end phase, will be described sequentially.

Figure 8:
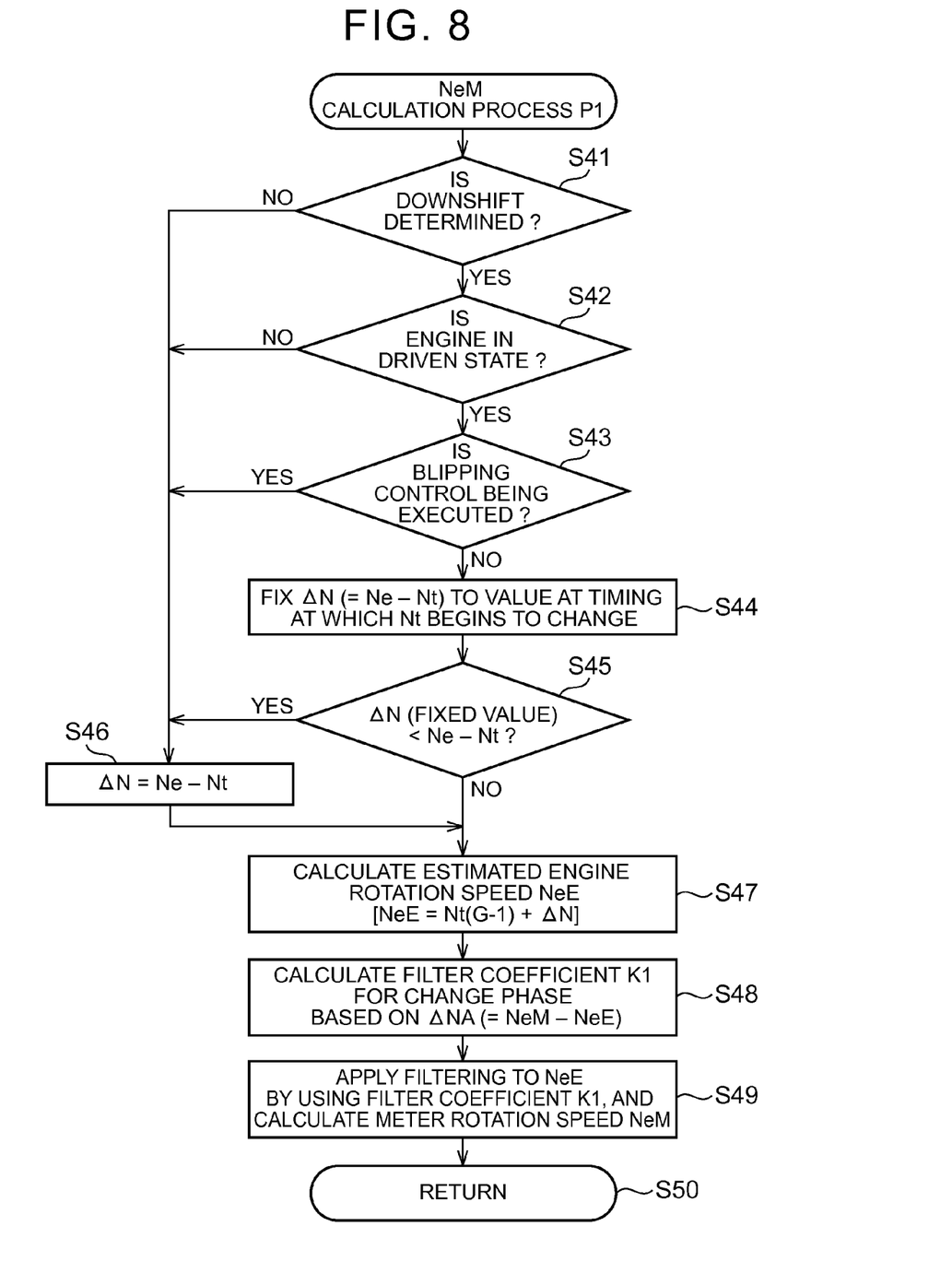
FIG. 8 is a flowchart for illustrating a calculation process for a meter rotation speed, which is executed in a change phase of a shift process.

FIG. 8 is a flowchart for illustrating the calculation process P1 for the meter rotation speed NeM, which is executed in the change phase of the shift process. The process of this flowchart is executed when it is determined in step S2 that the phase is the change phase and the process proceeds to step S4 in the process of the flowchart shown in FIG. 5.

As shown in FIG. 8, when the calculation process P1 is started, the ECU 800 initially determines in step S41 whether a downshift determination is made. As described above, a downshift determination is output when the operation point of the vehicle crosses the downshift line D in FIG. 6 from the high vehicle speed side to the low vehicle speed side.

When it is determined in step S41 that a downshift determination is made (YES in S41), the process proceeds to step S42. In step S42, the ECU 800 determines whether the engine is in the driven state.

Figure 9:
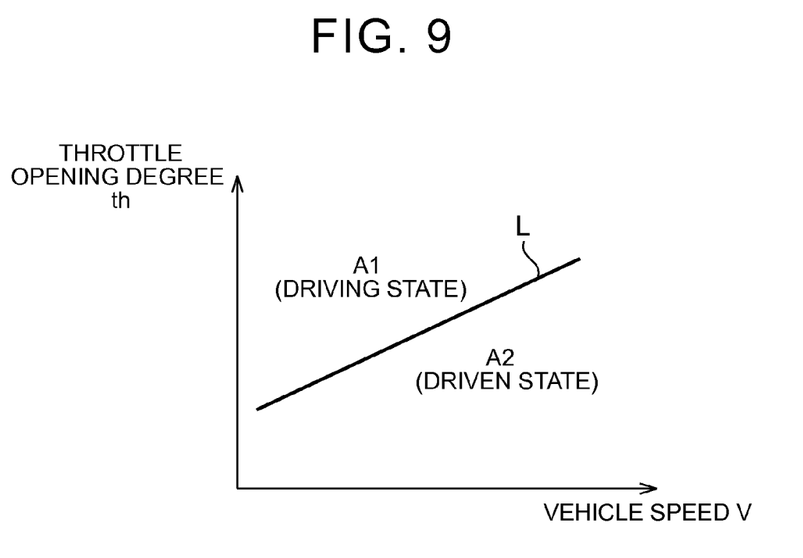
FIG. 9 is a view that shows an example of a map that is used at the time of determining whether an engine is in a driven state.

FIG. 9 is a view that shows an example of a map that is used at the time of determining whether the engine is in the driven state. In FIG. 9, the ordinate axis represents throttle opening degree th, and the abscissa axis represents vehicle speed V. A coordinate plane is divided into a region A1 and a region A2 with the line L set as a boundary. The region A1 indicates an engine driving state. The region A2 indicates the engine driven state. When the throttle opening degree is larger than the line L, larger engine torque is generated, so the vehicle is driven by the engine via the torque converter (engine driving state). On the other hand, when the throttle opening degree is smaller than the line L, engine torque becomes insufficient, so the engine is driven by the inertia force of the vehicle via the torque converter (engine driven state). The line L connects points at which the driving force of the engine and the running resistance of the vehicle are balanced. As the vehicle speed increases, the throttle opening degree increases. The ECU 800 determines whether the vehicle is currently in the engine driving state or the engine driven state on the basis of the vehicle speed V and the throttle opening degree th by consulting the map shown in FIG. 9.

When it is determined in step S42 that the engine is in the driven state (YES in S42), the process proceeds to step S43. In step S43, the ECU 800 determines whether blipping control is being executed. The blipping control means the process of reducing a shift shock by increasing the throttle opening degree to increase the torque of the engine at the time of carrying out a downshift.

When it is determined in step S43 that blipping control is not currently being executed (NO in S43), the process proceeds to step S44. In step S44, the ECU 800 fixes the correction amount ΔN to the value at the timing at which the turbine rotation speed Nt starts changing toward the target turbine rotation speed Nt(G−1) at the gear position after the shift. For example, at time t2 in FIG. 4, the turbine rotation speed Nt starts changing from the turbine rotation speed Nt(G), corresponding to the gear position before the shift, toward the turbine rotation speed Nt(G−1) corresponding to the gear position G−1 after the shift. Therefore, the difference in rotation speed (Ne−Nt) at time t2 is fixed as the correction amount ΔN, and is used to calculate the estimated engine rotation speed NeE after time t2.

Subsequently, in step S45, the ECU 800 determines whether the fixed correction amount ΔN is smaller than the difference (Ne−Nt) between the current engine rotation speed and the current turbine rotation speed.

When ΔN (fixed value) is smaller than Ne−Nt (YES in S45), this indicates that the difference between the input rotation speed (Ne) and output rotation speed (Nt) of the torque converter begins to increase as compared to that at the time at which ΔN is fixed, so fixing of the correction amount ΔN is cancelled.

When no downshift determination is made in step S41 (NO in S41) or when the engine is not in the driven state in step S42 (NO in S42) or when blipping control is being executed in step S43 (YES in S43) or when ΔN (fixed value) is smaller than Ne−Nt in step S45 (YES in S45), the process proceeds to step S46, and the correction amount ΔN is not fixed but calculated and updated by using ΔN=Ne−Nt. After that, the process proceeds to step S47.

On the other hand, when ΔN (fixed value) is not smaller than Ne−Nt in step S45 (NO in S45), the value fixed in step S44 is employed as ΔN, and the process proceeds to step S47.

In step S47, the estimated engine rotation speed NeE is calculated by the following mathematical expression.

$$NeE = Nt(G-1) + \Delta N$$

Nt(G−1) indicates the rotation speed (=turbine rotation speed) of the input rotary shaft of the automatic transmission on the assumption that the vehicle travels at the current vehicle speed V in the gear position G−1 after the downshift. ΔN indicates the correction amount fixed in step S44 or the correction amount updated in step S46.

The estimated engine rotation speed NeE corresponds to a target engine rotation speed in filtering, which is used at the time of calculating the meter rotation speed NeM. That is, a value before filtering is the estimated engine rotation speed NeE, and a value after filtering is the meter rotation speed NeM.

After the estimated engine rotation speed NeE is calculated in step S47, a filter coefficient K1 of the change phase is calculated on the basis of a rotation speed difference ΔNA (=NeM−NeE) in step S48. The filter coefficient will be described below.

Figure 10:
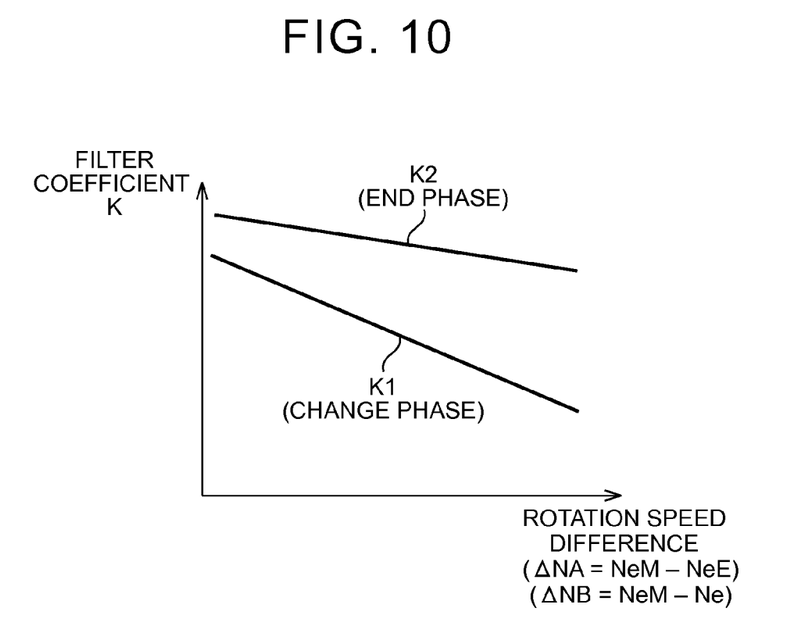
FIG. 10 is a view that shows an example of a map that is used at the time of determining a filter coefficient.

FIG. 10 is a view that shows an example of a map that is used at the time of determining the filter coefficient. In FIG. 10, the ordinate axis represents a filter coefficient K, and the abscissa axis represents a rotation speed difference. In the change phase, the filter coefficient K1 is determined as shown in FIG. 10.

The ECU 800 determines the amount of change per one process cycle such that the current meter rotation speed NeM reaches a target value (value before filtering) after a time corresponding to the filter coefficient K, and calculates a next-cycle meter rotation speed NeM. Therefore, as the filter coefficient K increases, a rate at which the meter rotation speed NeM follows the target value delays, so the change is slowly reflected in the output.

In FIG. 10, as the rotation speed difference between the current meter rotation speed NeM and the estimated engine rotation speed NeE that is the target value increases, the filter coefficient K1 decreases. That is, as the difference between the current value and the target value increases, a change in the output becomes faster through filtering; whereas, as the difference between the current value and the target value reduces, a change in the output becomes slower through filtering. Therefore, when the target value changes by a larger amount, trackability is increased; whereas, when the target value does not change so much, such a change that the value fluctuates little by little is suppressed. A filter coefficient K2 will be described later together with the flowchart of FIG. 11.

Referring back to FIG. 8, when the filter coefficient K1 is determined in step S48, the process proceeds to step S49. In step S49, the ECU 800 executes filtering by using the filter coefficient K1 while setting the estimated engine rotation speed NeE for the target value toward which the current meter rotation speed NeM is changed, and calculates the next meter rotation speed NeM. The rotation speed is displayed on the tachometer 500 on the basis of the meter rotation speed NeM. When the meter rotation speed NeM is calculated in step S49, control is returned to the flowchart of FIG. 5 in step S50.

Figure 11:
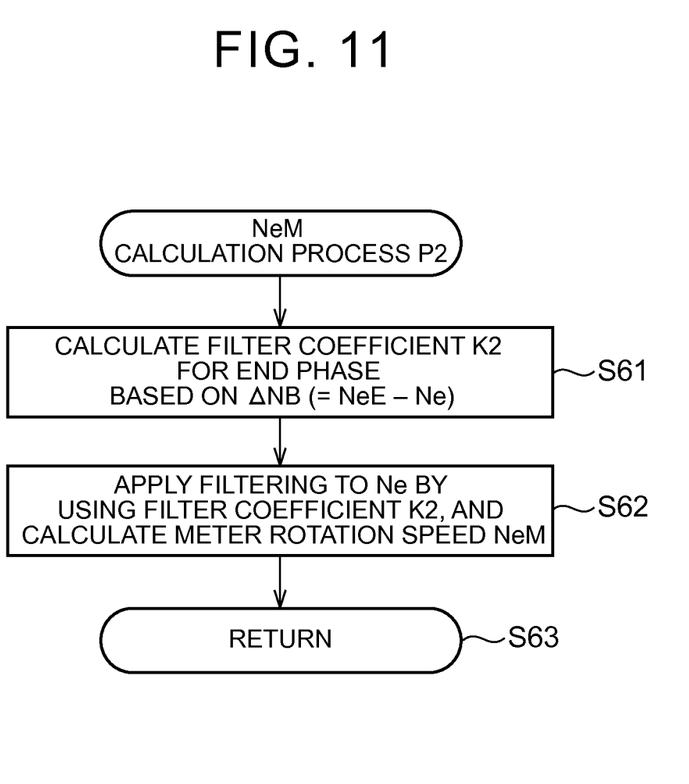
FIG. 11 is a flowchart for illustrating a calculation process for a meter rotation speed, which is executed in an end phase of the shift process.

Next, the calculation process for the meter rotation speed NeM, which is executed in the end phase, will be described. FIG. 11 is a flowchart for illustrating the calculation process P2 for the meter rotation speed NeM, which is executed in the end phase of the shift process. The process of this flowchart is executed when it is determined in step S2 that the phase is the end phase and the process proceeds to step S5 in the process of the flowchart shown in FIG. 5. The calculation process P2 is the process of slowly changing from the currently displayed meter rotation speed NeM to the actual engine rotation speed Ne by applying filtering.

As shown in FIG. 11, when the calculation process P2 is started, the ECU 800 initially calculates the filter coefficient K2 for the end phase on the basis of a rotation speed difference ΔNB (=NeM−Ne) in step S61. For example, as shown in FIG. 10, the filter coefficient K2 for the end phase is set so as to be larger than the filter coefficient K1 for the change phase. As the filter coefficient K increases, the rate of the change becomes slower. The width of change in engine rotation speed is smaller in the end phase than in the change phase, so K2 is set so as to be larger than K1. As in the case of K1, as the rotation speed difference increases, the filter coefficient K2 decreases.

When the filter coefficient K2 is determined in step S61, the process proceeds to step S62. In step S62, the ECU 800 executes filtering such that the meter rotation speed NeM is brought close to the engine rotation speed Ne, which is the target value of the meter rotation speed, at a rate corresponding to the filter coefficient K2, and calculates the meter rotation speed NeM. The tachometer 500 displays the rotation speed on the basis of the meter rotation speed NeM. When the meter rotation speed NeM is calculated in step S62, control is returned to the flowchart of FIG. 5 in step S63.

Lastly, referring back to FIG. 1 and FIG. 2, the present embodiment is summarized. The ECU 800 operates as the display control apparatus for the meter that is provided in the vehicle including the automatic transmission 300 equipped with the torque converter 200 and that displays the engine rotation speed. The ECU 800 is configured to, when the shift start condition of the automatic transmission 300 is satisfied, calculate the estimated rotation speed NeE of the engine 100 by adding the correction amount ΔN, corresponding to the state of the torque converter 200, to the turbine rotation speed Nt(G−1) of the torque converter 200, which corresponds to the gear position after the shift, and bring the meter rotation speed NeM close to the estimated rotation speed NeE. The ECU 800 is configured to, when a fixing condition, including that the shift start condition for a downshift is satisfied and the engine 100 is driven from the torque converter 200 side, is satisfied, fix the correction amount ΔN to a value at the time when the start of the shift is determined.

Preferably, the correction amount ΔN may be the difference between the engine rotation speed Ne and the turbine rotation speed Nt. It is possible to easily obtain the correction amount by using the rotation speed difference (Ne−Nt). A method of calculating the correction amount may be, for example, a method of calculating the correction amount from the torque capacity of a clutch.

With the above-described configuration, in the driven state where the engine 100 is driven by the torque converter 200, a change, such as inversion of the sign of the correction amount ΔN, does not occur, so it is possible to reduce an unnatural change in the meter rotation speed NeM.

The embodiment described above is illustrative and not restrictive in all respects. The scope of the invention is defined by the appended claims rather than the above description. The scope of the invention is intended to encompass all modifications within the scope of the appended claims and equivalents thereof.

What is claimed is:

1. A display control apparatus for a meter, the meter being mounted on a vehicle, the vehicle including an engine and an automatic transmission, the automatic transmission including a torque converter, the meter being configured to display a rotation speed of the engine, the display control apparatus comprising:
   an electronic control unit configured to:
      (i) determining whether a shift start condition is satisfied based on an accelerator operation amount and a vehicle speed;
      (ii) when the shift start condition of the automatic transmission is satisfied, calculate an estimated rotation speed of the engine by adding a correction amount commensurate with a state of the torque converter to a turbine rotation speed of the torque converter, the correction amount being a difference between an engine rotation speed and a turbine rotation speed, the turbine rotation speed corresponding to a gear position after a shift;

(iii) control the meter such that a rotation speed displayed on the meter is brought close to the estimated rotation speed in which the rotation speed of the meter is caused to follow a target value of an estimated rotation speed; and (iv) when the shift start condition for a downshift is satisfied and the engine is driven from the torque converter side, fix the correction amount to a value at the time when a start of the shift is determined.

2. The display control apparatus according to claim 1, wherein
the electronic control unit is configured to:
when a difference between a current engine rotation speed and a current turbine rotation speed becomes larger than the fixed correction amount, cancel fixing of the correction amount and apply the difference between the current engine rotation speed and the current turbine rotation speed as the correction amount, the current engine rotation speed and the current turbine rotation speed being measured in a set of iterative loops performed in a closed loop.

3. The display control apparatus according to claim 1, further comprising:
a rotation sensor configured to detect a rotation speed of the engine, wherein
the electronic control unit is configured to:
(v) output a gear position after the shift;
(vi) calculate a turbine rotation speed after the shift on the basis of the vehicle speed and the gear position after the shift; and
(vii) change the target value of the displayed rotation speed to one of the estimated rotation speed and the rotation speed of the engine, detected by the rotation sensor, on the basis of a progress of the shift.

4. The display control apparatus according to claim 3, wherein the electronic control unit is configured to change a rate at which the rotation speed displayed on the meter is set to the target value, on the basis of the progress of the shift.

5. The display control apparatus according to claim 1, wherein
the correction amount is fixed to the value at the time when the start of the shift is determined in response to blipping control not being executed, and
the blipping control is a control in which an engine torque is increased by increasing a throttle opening degree during a shift.

* * * * *